United States Patent [19]

Saban

[11] 4,242,717
[45] Dec. 30, 1980

[54] BOXED METALLIZED FILM CAPACITOR

[75] Inventor: John F. Saban, Downers Grove, Ill.

[73] Assignee: Western Electric Company, Inc., New York, N.Y.

[21] Appl. No.: 974,151

[22] Filed: Dec. 28, 1978

[51] Int. Cl.³ .................. H01G 1/02; H01G 1/14
[52] U.S. Cl. .................. 361/308; 174/52 PE
[58] Field of Search ............ 361/308, 309, 306, 404; 29/25.42, 628, 621; 338/322; 174/52 PE

[56] References Cited

U.S. PATENT DOCUMENTS

| | | | |
|---|---|---|---|
| 1,619,201 | 3/1927 | Fried | 361/306 X |
| 1,833,392 | 11/1931 | Dublier | 361/306 |
| 1,900,352 | 3/1933 | Lewis | 361/306 X |
| 2,615,946 | 10/1952 | Katzman | 339/278 R |
| 3,134,059 | 5/1964 | Rayburn | 361/308 |
| 3,222,450 | 12/1965 | Lee | 174/52 PE |
| 3,243,675 | 3/1966 | Rayburn | 361/308 |
| 3,259,862 | 7/1966 | Richard | 174/52 PE |
| 3,364,401 | 1/1968 | Rayburn | 361/309 |

FOREIGN PATENT DOCUMENTS 335144  9/1930  United Kingdom .................. 361/308

OTHER PUBLICATIONS

"2-Lead Dip Ceramic Caps by AVX", in Electronic News, 10/76, p. 48.

Primary Examiner—E. A. Goldberg
Attorney, Agent, or Firm—R. P. Miller

[57] ABSTRACT

A rolled metallized film capacitor blank and a pair of terminals are assembled in a small plastic box. The terminals are heated by an electric circuit to bond the terminals to heat fusible electrodes formed on the opposed ends of the capacitor blank. The terminals are provided with serrated or metal deforming sections which bite into the engaged end electrodes during assembly of the capacitor blank in the box to insure good contact during the subsequent electrical heating step.

1 Claim, 5 Drawing Figures

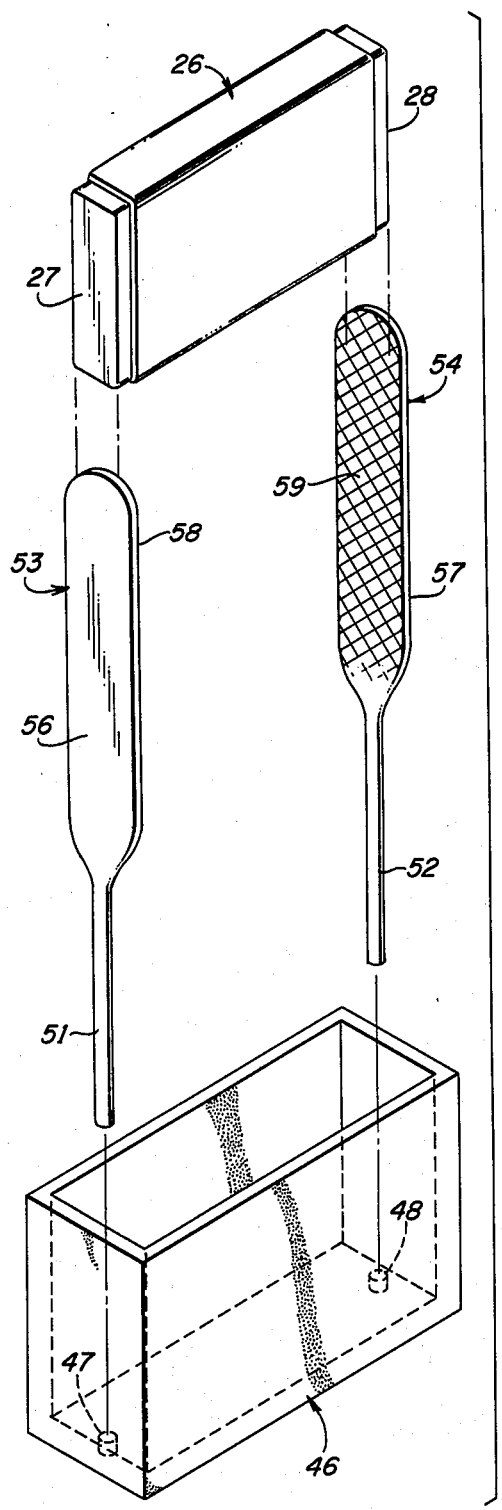
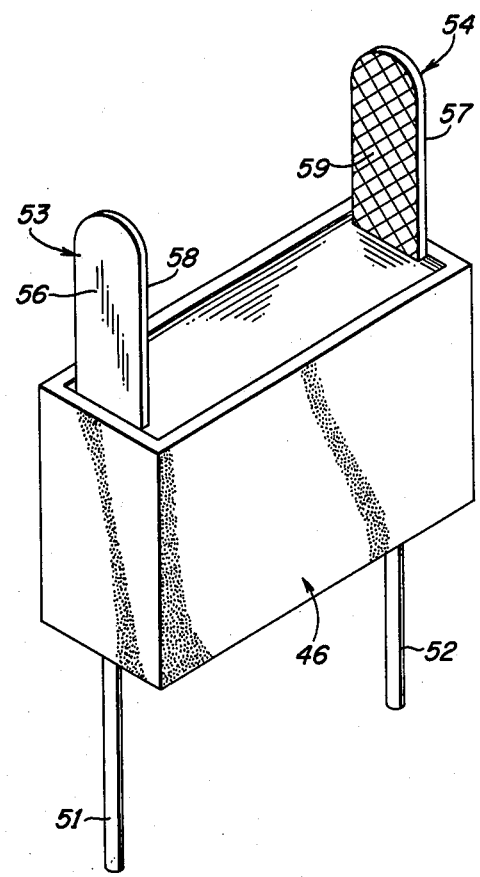
FIG. 4
FIG. 5

BOXED METALLIZED FILM CAPACITOR

TECHNICAL FIELD OF THE INVENTION

This invention relates to rolled metallized film capacitors and a method of terminating such capacitors within an insulating box or casing, and more particularly, to assembling a capacitor and terminals within a small plastic box so that the terminals bite into heat fusible end electrodes to assure good bonds during a subsequent electrical resistance heating of the terminals.

BACKGROUND OF THE INVENTION

With the advent of semi-conductor technology and the consequent miniaturization of circuit designs, there are continuing needs for subminiature packaged passive electrical components that are machine insertable into printed circuit boards or other circuit supports. Many semi-conductor circuits and integrated circuits have been packaged in small plastic cases which are known as DIP's (Dual In-Line Packages) and which are machine insertable in, and mass solderable to, circuit boards. In the design of these complex miniature circuit packages, ceramic capacitor packages have been used because of their small size and adapability to machine insertion.

Rolled metallized film capacitors have had limited use in the newer miniature circuit designs because of their relatively large size and lack of susceptibility to machine insertion.

However, rolled film capacitors possess certain desirable properties over ceramic capacitors such as precise capacitance value, stable frequency characteristics, long life and good stability under varying temperature and humidity operating conditions. These rolled film capacitors also possess the characteristic of forming an open in a circuit upon breakdown rather than a short circuit condition which results from a breakdown of a ceramic capacitor.

One of the problem areas in the development of miniature boxed rolled metallized film capacitors resides in providing terminations which may be assembled to rolled film capacitor blanks within small plastic boxes similar to the boxes used to package DIP's. Moreover, the terminations to a rolled film capacitor require that the terminations be made within a minimum introduction of added series resistance resulting from the bonding of terminals to the rolled film capacitor blank.

Numerous termination structures and methods of assembly have been developed to terminate rolled film capacitor blanks, but in general, these techniques are not concerned with terminating a capacitor blank within a small plastic box. U.S. Pat. No. 2,915,946 to J. Katzman discloses a pair of terminals having knurled or serrated sections which are wrapped with the metal foils of a paper-foil condenser to mechanically contact and terminate the respective foils. U.S. Pat. No. 3,243,675 to C. C. Rayburn shown a convolutely rolled capacitor that is terminated by pressing electrically heated wires into opposed ends of a metal foil-dielectric film capacitor blank to melt and shape portions of the dielectric films about the lead wires to secure the leads in contact with the metal foils. In present day commercial manufacture, a common expedient used to terminate rolled metallized film capacitors includes spraying a low melting point metal such as zinc against the opposite ends of the capacitor blank to form heat fusible end electrodes. Next, pretinned lead wires are heated and pressed against the end electrodes to metallurgically bond the leads to the end electrodes and, hence, to the metallized coatings on the respective rolled films.

SUMMARY OF THE INVENTION

The present invention contemplates, among other things, heating a pair of elongated terminal members and then forcing a rolled film capacitor blank having heat fusible end electrodes between the terminals so that knurled or serrated surfaces on the terminals bite into and are bonded to the end electrodes.

More particularly, the elongated terminals may be mounted to lie along opposed sidewalls of a small plastic box while sections of each terminal extend in two directions beyond the box. The extending portions of the terminals are connected in an electrical circuit to effectuate a heating of the terminals to such a degree to metallurgically bond the terminals to the heat fusible end electrodes of the capacitor blank with a minimum introduction of series resistance.

BRIEF DESCRIPTION OF THE DRAWING

Other features and advantages of the invention will be apparent upon consideration of the following detailed description and drawings, wherein:

FIG. 4 is an exploded perspective view of another embodiment of the invention wherein knurled paddle-like terminals are used in the assembly of a boxed capacitor in accordance with the principles of the invention; and FIG. 5 is a perspective view of an encapsulated rolled film capacitor constructed with the elements shown in FIG. 4.

Referring to FIG. 1, there is illustrated a rolled metallized film capacitor blank 10 which may be constructed of a pair of convoluted metallized dielectric films which are wound together to abut the metallized surface of each film against the unmetallized surface of the other film. These films are usually constructed of a polycarbonate or a polyester such as sold under the trademark MYLAR$^R$. The metallization of each film is accomplished by advancing a sheet of plastic film material through a metal, vapor deposition chamber which is maintained in vacuum while a thin coating of a metal or metals such as zinc and silver is deposited on one surface of the sheet. The metal is deposited through a mask so that unmetallized strips appear along the length of the sheet. The sheet is slit along the centers of the unmetallized strips to form individual metallized films, each of which will have one edge margin free of deposited metal. Next, pairs of film are simultaneously wound in a slightly offset relationship so that the respective metallized surfaces run to opposed ends of the capacitor blank. The blanks may be flattened and then heat fusible metal such as zinc or solder is mask sprayed onto the ends of the wound capacitor blank to form porous end electrodes 11 and 12 of heat fusible material. Subsequent thereto, the capacitor is impregnated with a wax to provide a moisture seal.

Though one method for fabricating a rolled metallized film capacitor is set forth above, there are other methods such as disclosed in application Ser. No. 974,182 entitled METALLIZED FILM CAPACITOR AND METHOD OF MANUFACTURE filed in the names of W. J. Fanning and O. T. Masopust, Jr. on even date herewith and assigned to the Western Electric Company, Incorporated. This application describes a method wherein the metal masking step is eliminated and laser beams are utilized to establish the effective areas of the capacitor plates as the metallized film is wound into a capacitor blank. In the practice of that method, a capacitor blank may be made in a very small size and, thus, that method may represent the best mode for producing miniature capacitor blanks of the type that may be boxed and terminated in accordance with the present invention. Further, it is to be understood that other types of electrical devices, such as resistors, may be boxed and terminated in accordance with the present invention.

Figure 1:
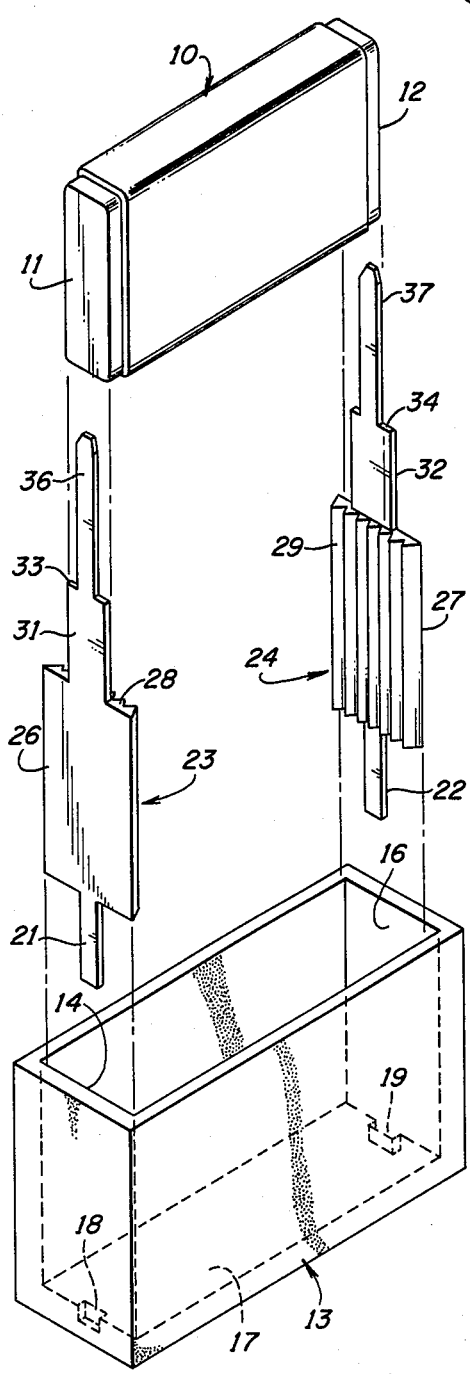
FIG. 1 is an exploded perspective view of the elements of a boxed and terminated rolled film capacitor which may be assembled and bonded in accordance with the principles of the present invention.

Still referring to FIG. 1, there is shown a small plastic box 13 constructed of a plastic material, e.g., RYTON$^R$ polyphenyl sulfide sold by Phillips Petroleum Company, having good dielectric flame retardant properties as well as the property of being able of being molded into a small size while holding close tolerances. The box has opposed sidewalls 14 and 16 and a bottom 17. In the proximity of the centers of the junctures of the bottom with the sidewalls there are formed a pair of slots or holes 18 and 19 of such shape and size as to receive force fitted shanks 21 and 22 of a pair of terminals 23 and 24.

The terminals 24 and 26 which may be pretinned and formed of phospher bronze are shaped to provide enlarged flat sections 26 and 27 which are to be bonded to the end electrodes 11 and 12 of the capacitor blank. The inner surfaces of the flat sections 26 and 27 are serrated to form parallel, projecting ridges 28 and 29 that are capable of biting into the heat fusible end electrodes 11 and 12. The terminals are also provided with intermediate wide sections 31 and 32 having shoulders 33 and 34 which act as stops or standoffs for limiting insertion of the terminals into openings formed in a printed circuit during subsequent utilization of a boxed rolled film capacitor. In addition, the terminals include elongated lead sections 36 and 37 which are subsequently utilized to secure the box rolled capacitor to a utilization circuit which may be formed on a printed circuit board. When inserted on a printed circuit board, the leads 36 and 37 may be crimped and wave soldered to bond the boxed capacitor into the circuit formed on the circuit board.

Figure 2:
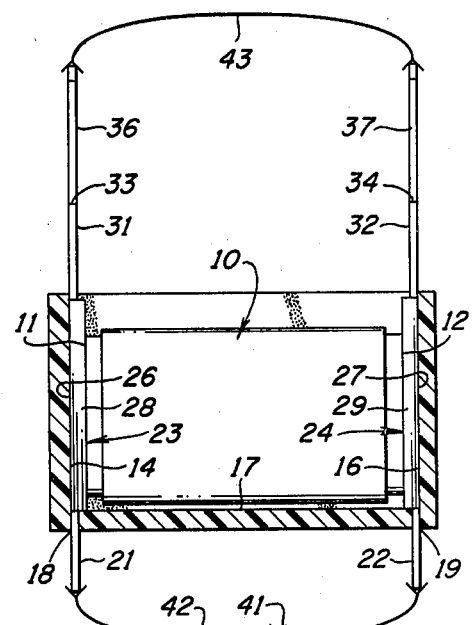
FIG. 2 is a side elevational view, partially in section, of an assembled rolled film capacitor together with an electrical circuit for bonding the terminals to the capacitor blank.

In practice of the method a plastic box 13 may be molded with or provided with subsequently formed openings 18 and 19. Terminals 23 and 24 are mounted in the box with the flat sections 26 and 27 resting against the opposed walls 14 and 16 while the shanks 21 and 22 extend through the bottom holes 18 and 19. Next, a capacitor blank 10 is inserted in the box 13 so that the serrated projecting ridges 28 and 29 bite into the end electrodes 11 and 12. The assembled box capacitor and terminals are best illustrated in FIG. 2 which also shows the extended shanks 21 and 22 as being connected in schematically shown electric circuit including an energy source 41 and a circuit maker 42. The extending portions of lead sections 36 and 37 are selectively interconnected by a strap wire 43. Closure of the circuit maker 42 for an instant will apply a surge of current through the terminals 23 and 24 causing the terminals to heat and melt or soften the contacted heat fusible end electrodes 11 and 12. The opening of the circuit breaker 42 interrupts the application of heat whereupon the melted portions of the end electrodes 11 and 12 are bonded to the contact sections 26 and 27 of the terminals. In the alternative, separate heating circuits may be attached to the individual leads.

Figure 3:
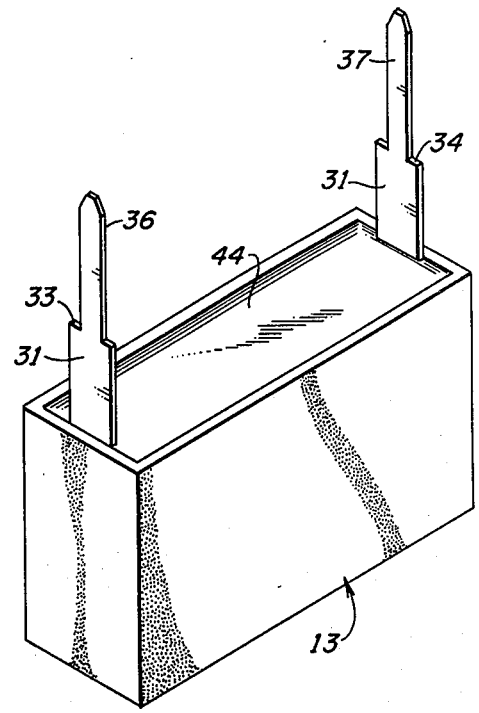
FIG. 3 is a perspective view of an encapsulated box film capacitor which has been terminated in accordance with the method of the present invention.

The extending portions of the shanks 21 and 22 are then clipped off as illustrated in FIG. 3. The box 13 is then filled with a suitable encapsulating material 44 such as an epoxy.

It will be noted that the intermediate wide sections 31 and 32 extend beyond the top of the box so that these sections will function as standoffs when the boxed capacitor is mounted on a printed circuit board with the lead sections 36 and 37 extending through holes formed in the circuit board. During such a mounting, the shoulders 33 and 34 will engage the surface of the circuit board to mount the box capacitor in the standoff position, thus precluding contact with circuit paths or components that may be positioned beneath the boxed capacitor.

In an alternative construction, the intermediate wide sections 31 and 32 can be eliminated and a simple wire-like lead be utilized so that the boxed capacitor will lie flat against the top surface of a printed circuit board on which it is mounted.

Referring now to FIG. 4, there is again shown a small plastic box 46 having holes 47 and 48 shaped to receive a pair of force-fitted, wire-like shanks 51 and 52 of terminals 53 and 54. These terminals are provided with wide sections 56 and 57 having knurled surfaces 58 and 59.

In practice of the method to assemble and produce this embodiment, the wire-like shanks 51 and 52 are inserted in the holes 47 and 48 to assemble the terminals with the knurled sections 58 and 59 positioned adjacent to the opposed walls of the open-ended box 46. A capacitor blank 26 is again pushed or forced into the box so that the knurled surfaces 58 and 59 bite into the heat fusible end electrodes 27 and 29. The terminals 53 and 56 are connected in an electric circuit in a manner shown in FIG. 2 to effectuate the heating of terminals and a bonding of the knurled sections to the end electrodes 27 and 28. Finally, the boxed capacitor is encapsulated as shown in FIG. 5 and the extending portions of the wire shanks 51 and 52 or the extending portions of the terminal blade sections 56 and 57 may be severed to provide a boxed capacitor readily susceptible to machine insertion in a printed circuit board.

What is claimed is:

1. A capacitor assembly, comprising a box having one open side and a pair of spaced holes formed in the bottom of the box in proximity to the juncture of the bottom and a pair of opposed side walls;

a pair of terminals mounted within said box, said terminals having leg sections extending into said holes to position the terminals along said opposed side walls and wide sections facing each other and integral with the leg sections to form shoulders abutting the bottom of the box, said wide sections having protuberances projecting from facing surfaces, said wide sections being joined to intermediate wide sections that extend beyond the open side of the box to act as standoffs which are joined at shoulders to narrower lead sections which may be joined to external circuitry; and a capacitor blank having terminal pads of a deformable metal, said capacitor mounted in said box with the faces of the terminal pads abutting the said wide sections and deformed in accordance with the configuration of said protuberances.

* * * * *